United States Patent [19]

Junod et al.

[11] Patent Number: 4,540,392
[45] Date of Patent: Sep. 10, 1985

[54] METHOD AND APPARATUS TO SEAL COATED PAPERBOARD MATERIALS

[75] Inventors: John E. Junod, Philadelphia, Pa.; Barry P. Fairand, Columbus, Ohio

[73] Assignee: International Paper Company, New York, N.Y.

[21] Appl. No.: 564,957

[22] Filed: Dec. 23, 1983

[51] Int. Cl.³ .............................................. B31C 3/00
[52] U.S. Cl. ................................ 493/303; 156/272.8; 493/135; 493/276
[58] Field of Search ............... 219/2 D, 2 LF, 2 LS, 219/2 LM; 493/133, 134, 135, 303, 107, 274, 276; 156/272.8, 218

[56] References Cited

U.S. PATENT DOCUMENTS

| | | | |
|---|---|---|---|
| 1,164,153 | 12/1915 | Woods | 493/276 |
| 2,403,995 | 7/1946 | Peters | 493/274 |
| 3,293,652 | 12/1966 | Roshon | 346/76 |
| 3,369,101 | 2/1968 | Curcio | 219/121 |
| 3,382,343 | 5/1968 | Muncheryan | 219/121 |
| 3,382,779 | 5/1968 | Lynos | 493/276 |
| 3,419,706 | 12/1968 | Lohrmann | 219/384 |
| 3,456,863 | 7/1969 | Mollison et al. | 229/48 |
| 3,560,291 | 2/1971 | Foglia et al. | 156/229 |
| 3,594,261 | 7/1971 | Broerman | 161/62 |
| 3,717,536 | 2/1973 | McVay | 493/274 |
| 3,749,878 | 7/1973 | Sullivan et al. | 219/121 L |
| 3,824,368 | 7/1974 | Locke | 219/121 LM |
| 3,974,016 | 8/1976 | Bondybey | 156/272.8 |
| 4,029,535 | 6/1977 | Cannon et al. | 156/272 |
| 4,161,808 | 7/1979 | Wittstock | 29/33 R |

Primary Examiner—Leon Gilden
Attorney, Agent, or Firm—Richard J. Ancel

[57] ABSTRACT

A method and apparatus for forming a seam on a thermoplastic coated container, which container has been formed from a single blank or a continuous by bending the substrate member from which container was formed and overlapping opposite edges thereof to form the seam. According to the practice of this invention, the edges of the substrate member which are to be overlapped and joined to form the seam are each heated, prior to their overlapping, by energy from a laser to thereby render the thermoplastic coatings on the overlapped portions of the substrate member soft and tacky so that they will adhere to each other when pressed together and allowed to cool. The laser energy is applied by directing an unfocused laser beam of 10.6 μm wavelength over a zone about one-half inch in width to each of the two edges, the web or blanks being fed along a conveyor past the stationary laser sources.

14 Claims, 7 Drawing Figures

METHOD AND APPARATUS TO SEAL COATED PAPERBOARD MATERIALS

BACKGROUND OF THE INVENTION

This invention relates to a method and apparatus useful in making containers in the form of tubular members fashioned from thermoplastic coated paperboard.

Containers fashioned from paperboard are often formed from single blanks having thermoplastic coatings, of the same or of different thicknesses, on their surfaces. Examples of such containers are afforded by paperboard cans and by the well known gable-top milk cartons. Other containers of paperboard may be circular, oval or of any other desired cross-section. While many paperboard containers are fashioned from a single blank, often the side walls are formed with separate formations or operations being required to form the bottom and the top of the container. Whether fashioned from a one piece blank or from several elements, the side walls of most paperboard containers require a side seam. This seam is formed by heating opposite edges of the blank, one surface each of these opposite edges being softened and becoming tacky so that when overlapped and pressed together the thermoplastic will form a joint, thereby forming the seam. Presently employed techniques for heating the edges of the blank which are to form the lapped joint or seam employ heating by gas, by hot air, by hot rollers, or by ultrasonics. Each of these techniques exhibits various deficiencies such as inconsistent or nonuniform heating, inefficient utilization of the energy to soften the plastic, or slow process speeds.

The use of laser energy for communications, for cutting metals, and also for sealing and cutting plastic materials is known. However, lasers have not been widely applied in the paper container field. Workers in this art have apparently not recognized that laser energy may be employed in paperboard containers such as for forming seams in the bodies of such containers. By the practice of this invention, relatively high line speeds of paperboard blanks used to form containers may be realized. For example, the practice of this invention admits of line speeds up to 20,000 feet per hour. Further, because of the uniformity of the applied energy from the laser beams, the resultant side seam of the container wall is of uniform quality.

SUMMARY OF THE INVENTION

The present invention is directed to a method and apparatus for forming a seam on a thermoplastic coated container, which container has been formed from a single blank by bending the blank and overlapping opposite edges thereof to form the seam. According to the practice of this invention, the edges of the blank which are to be overlapped and joined to form the seam are each heated, prior to their overlapping, by energy from a laser to thereby render the thermoplastic coatings on the overlapped portions of the blank soft and tacky so that they will adhere to each other when pressed together and allowed to cool. The laser energy is applied by directing an unfocused laser beam of 10.6 μm wavelength over a zone about one-half inch in width to each of the two edges, the blanks being fed along a conveyor past stationary laser sources. The paperboard operated upon by the laser sources may be in the form of a continuous web, or in the form of individual blanks formed from a continuous web as by cutting it transversly of its length. Both types of paperboard are referred to below as substrate members.

The full nature of the invention will be understood from the accompanying drawings and the following description and claims. It should be understood, however, that references in the following description to right, left, front, rear, or side edges and upper and lower surfaces are for convenience of description, and such terms are not intended to be used in a limiting sense.

DETAILED DESCRIPTION OF THE INVENTION

Figure 1:
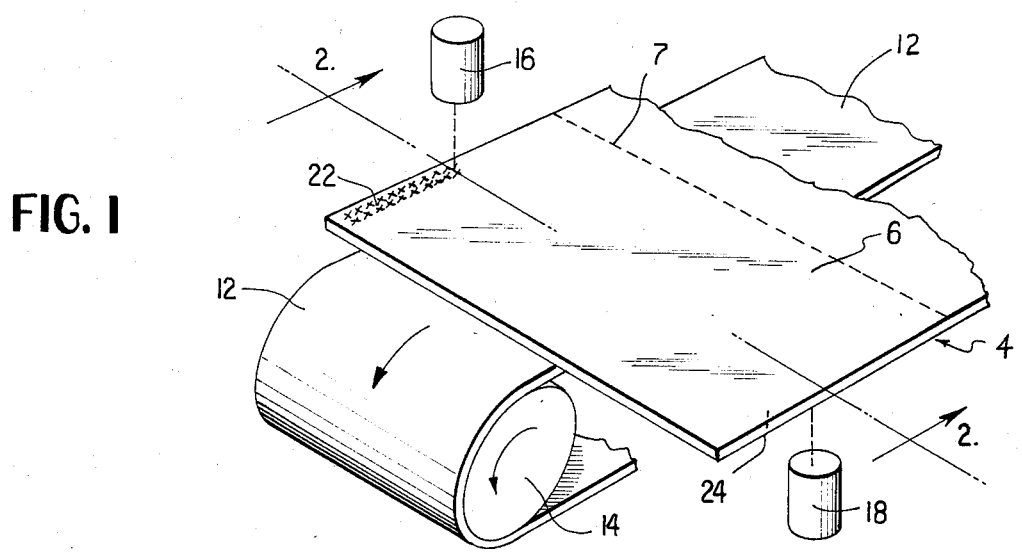
FIG. 1 is a partially schematic broken away view of the method and apparatus of this invention.

Referring now to the drawings, the numeral 4 denotes a substrate member or workpiece in the form of a blank or a continuous web which will subsequently be formed into a container or a container wall, the substrate member being formed of laminated paperboard or the like and being resilient, foldable and bendable. Both surfaces of the substrate member 4 are conventionally coated with a thermoplastic material, such as polyethylene, having a thickness of about 0.002 inches. In addition, the substrate member may include a metallic foil layer, and one suitable laminate construction is thermoplastic-paper-thermoplastic-foil-thermoplastic, the thermoplastic generally comprising polyethylene. It will also be understood that the thickness of the thermoplastic coatings on the surfaces may be the same or different. The numeral 12 denotes an endless conveyor belt for carrying the substrate member, one roller of the conveyor indicated by the numeral 14 and carrying the substrate member in the indicated direction. The substrate member 4 is adapted to be cut, as indicated by the dashed line running transversely thereacross, to form a continuous series of individual blanks 6, the longitudinally spaced cuts denoted by the numeral 7. In lieu of a continuous substrate member 4, a series of individual blanks 6, spaced apart a desired predetermined distance by conventional blank feeding apparatus, may be placed on conveyor belt 12. The numerals 16 and 18 denote conduits for laser energy from a conventional laser apparatus, the laser energy emanating therefrom being indicated schematically by dashed lines. The numerals 22 and 24 denote heated, softened and tacky zones or portions along the edges of the web or blank. The reader will understand that heated strip 22 is adjacent the left edge of the web or blank and is on the upper surface thereof. Heated strip, portion or zone 24 is on the lower surface of the web or blank on the right hand edge thereof. As the web or blanks move in the indicated direction at FIG. 1, the edges of the web or blank are heated by the laser energy. In practice, the blanks 6 are placed on the conveyor belt 12 from a dispensing station, with the blanks being spaced along and carried by belt 12. After the heating operation, the blanks are removed from the conveyor for subsequent formation into containers or container walls. In the event substrate member 4 is a continuous web, it is cut along lines 7 to form the blanks 6 subsequent to the laser heating operation.

Figure 2:
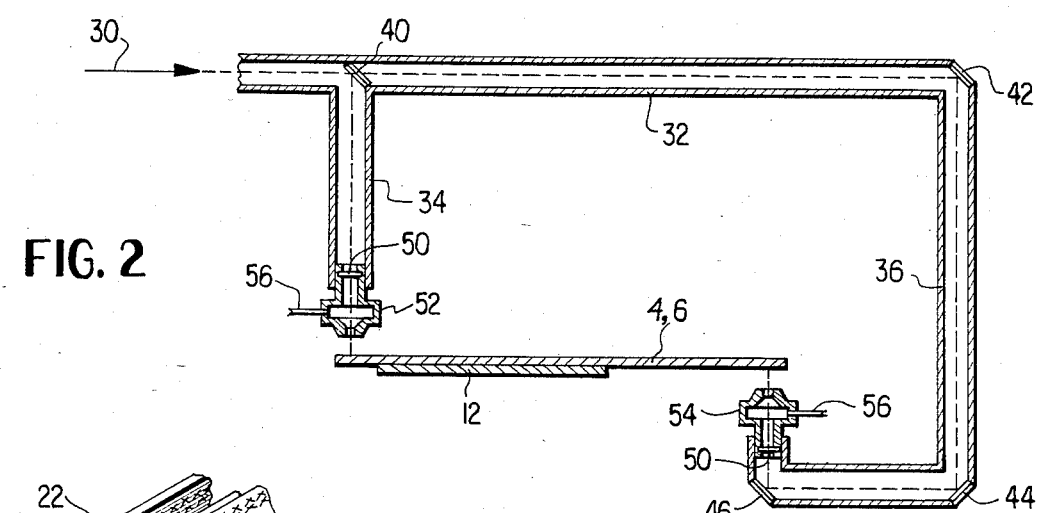
FIG. 2 is a view taken along section 2—2 of FIG. 1 and illustrates details of the laser beam forming and focusing apparatus schematically indicated in FIG. 1, all in relation to the substrate member shown at FIG. 1.

FIG. 2 illustrates in greater detail the apparatus and method somewhat schematically indicated at FIG. 1. The numeral 30 at FIG. 2 indicates a beam of laser energy fed from a conventional laser, not illustrated, into a first tubular conduit or guide 32 with branch guides 34 and 36 of the conduit extending at right angles to it. The numeral 40 denotes a laser beam splitter, one half of the energy of laser beam 30 being directed into laser guide 34, with the other half being reflected from laser beam benders or mirrors 42, 44, 46 in tubular conduit or guide 36. The numeral 50 denotes a zinc selenide lens in each of nozzle elements 52 and 54. The numeral 56 indicates a gas inlet for each of the nozzles 52 and 54. The reader will understand that elements 34, 50 and 52 correspond to schematically designated element 16 of FIG. 1, while elements 36, 42, 44, 46 and 54 correspond to schematically indicated element 18 of FIG. 1. As shown at FIG. 2, laser energy strikes the upper surface of the left hand portion of web 4 or blank 6 as it moves, toward the reader in FIG. 2, while a strip or zone along the lower portion of the right hand edge of the web or blank is similarly subjected to laser energy.

Figure 3:
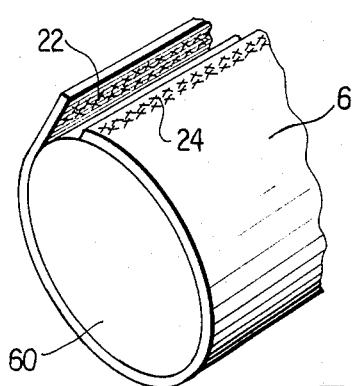
FIG. 3 is a perspective view illustrating how, i.e., a tubular member or a container wall is formed from the substrate member of FIG. 1 by overlapping opposite edges thereof to form a seam.

After the entire length of alternate surfaces of opposite edges of blank 6 has been heated and become soft and tacky, the blank is formed about mandrel 60, such as shown at FIG. 3, with zone 22 of one edge of the blank 10 being superposed over zone 24 of the other edge of blank 6. Pressure is then applied, and the overlapped portions are allowed to cool, thereby forming a seam.

In the process and apparatus of FIGS. 1 and 2, a carbon dioxide ($CO_2$) laser may be employed, such a laser operating at a wavelength of 10.6 $\mu$m.

Referring again to FIG. 3 of the drawings, the thus treated blanks are removed from the end of the conveyor and sequentially placed upon the mandrel 60. By means of conventional machinery and techniques, each blank 6 is bent around the mandrel so as to assume the form indicated at FIG. 3. Subsequent to the position indicated at FIG. 3, the heated, tacky and softened strips or zones 22 and 24 are pressed together and allowed to cool. The blanks 6 are now in the form of a continuous annular wall element or tube member. These members are then provided with bottom and top closure elements, as is well known in the art, to form paperboard cans. While the process is described as applicable to a substrate member formed from paperboard coated with thermoplastic on its surfaces, the substrate member may also be formed of a plastics material alone.

Laser sealing utilizes the directed energy in a laser beam to heat the thermoplastic coating to its softening point whereupon sealing is accomplished by pressure bonding of the heated surfaces. The laser beam is focused to the width (0.5 inches) of the seam to be sealed and the paperboard product is moved under the laser beam at the velocity required to heat the plastic coating to its softening point. Because untreated polyethylene is substantially transparent to the 10.6 $\mu$m radiation of a $CO_2$ laser, most of the incident laser radiation is transmitted through polyethylene coating 8 and absorbed in the underlying paperboard. Paperboard is a good absorber of 10.6 $\mu$m laser light; consequently most of the incident radiation is absorbed in a thin surface paperboard region 10 which is typically less than the thickness of the polyethylene coating (0.0015 inches). Heating of the polyethylene coating 8 occurs by conduction of heat from the surface of the paperboard into the coating. This mode of heating is depicted in FIG. 4 by the dithered arrow pointing to the left.

Figure 4:
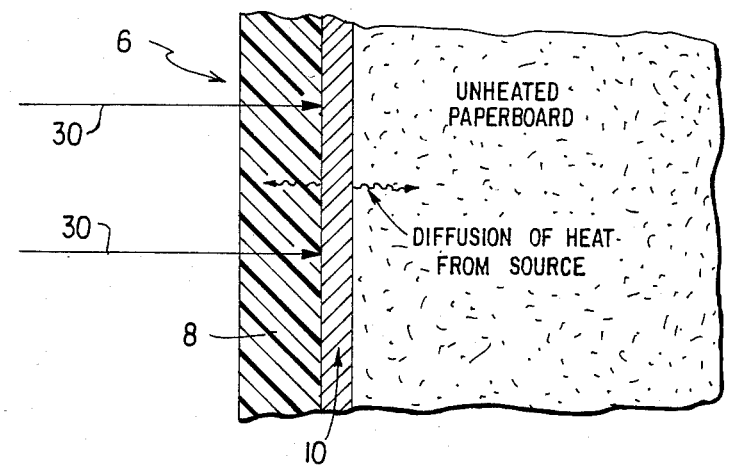
FIG. 4 is a partial transverse cross-sectional view of the substrate member of FIGS. 1 and 2.

As shown in FIG. 4 by the dithered arrow pointing to the right, heat also is conducted out of the source region into the paperboard. This problem involves a two region, one finite and the other semiinfinite in thickness, heat transfer analysis with a time dependent source function. Rigorous solution requires numerical techniques; however, guidelines to important parameters governing heating and cooling of the polyethylene coating can be determined if the following assumptions are made. First, the time dependent source function is represented by a temporally square incident laser irradiance (laser power density) with a uniform spatial distribution. The laser deposition time is characterized by the ratio of laser spot diameter to process speed. Secondly, because the thermal diffusivity coefficient of polyethylene is much greater than paperboard, it is assumed that the polyethylene coating thermally equilibrates with the source region, i.e., surface of the paperboard, in a time of the order of the deposition time. This time normally is much less than the time increment between heating and pressure bonding of the surfaces. A fraction of the incident laser irradiance is used to heat the polyethylene coating during the laser deposition time; thereafter cooling of the coating occurs as heat diffuses into the paperboard. Finally, a good seal requires the temperature of the coating to at least equal its softening point value (118° C.) at the time pressure bonding occurs.

Based on the above assumptions, the problem can be approximated by solving for the time dependent change in temperature at the surface of the paperboard wherein the temperature is governed by diffusion of heat into a semi-infinite medium (paperboard). The solution for the time dependent change in temperature at the surface of the paperboard is:

$$\Delta T = \frac{I_{PB}}{ka} \left\{ \left( \exp(ka^2 t) \operatorname{erfc}[a(Kt)^{\frac{1}{2}}] - \exp[Ka^2(t-\tau)] \operatorname{erfc}\{a[K(t-\tau)]^{\frac{1}{2}}\} + \frac{2a}{\pi^{\frac{1}{2}}} [(Kt)^{\frac{1}{2}} - \{K(t-\tau)\}^{\frac{1}{2}}] \right) \right\} \quad (1)$$

$$t > \tau$$

where
  $I_{PB}$ = fraction of laser irradiance absorbed in the paperboard
  k = thermal conductivity of paperboard
  a = absorption coefficient in paperboard
  K = thermal diffusivity coefficient of paperboard
  $\tau$ = laser deposition time Here erfc (X) is the complementary error function.
The total absorbed laser irradiance is given by $$I_a = I_{PB} + I_P \tag{2}$$

where $I_P$ is the fraction of the laser irradiance used in heating the polyethylene coating 8 to its softening point. The solution given by Eq. (1) is used in the following to compare experiment with theory.

EXAMPLE

Figure 5:
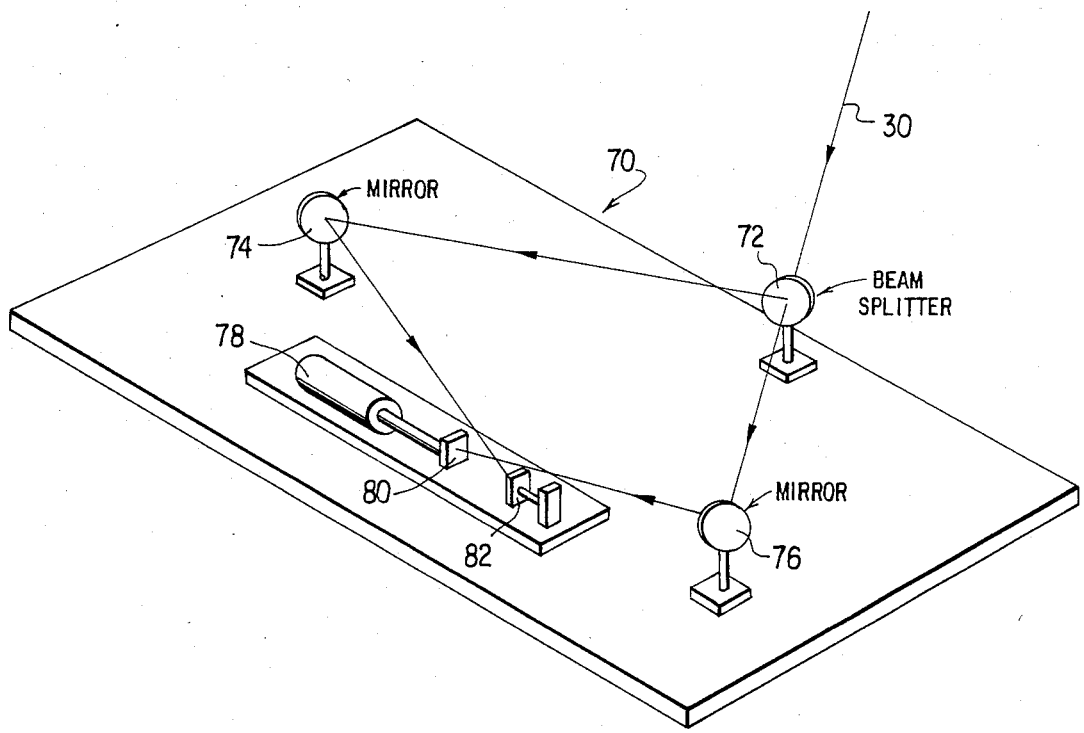
FIG. 5 is a partly schematic perspective view of a test installation.

Sealing tests were run on polyethylene coated paperboard stock. In one set of tests, the short dwell time associated with rapid movement of the work piece under the beam was simulated by operating the laser in a pulsed mode, where the laser on-time equalled the dwell time. This simplification allowed the test specimens to be positioned on stationary test plates which were pneumatically driven together after laser heating was completed. A schematic of the apparatus is shown in FIG. 5. A beam splitter 72 divided the laser beam into two equal components which were directed by mirrors 74 and 76 onto coated polyethylene paperboard test specimens attached to plates 80, and 82, the former being adjustable in position by means of hydraulic motor 78. The power in the 0.5 inch diameter-unfocused laser beam 30 was distributed in a donut configuration. For production conditions, where the part is rapidly translated under the laser beam, this beam geometry would permit uniform strip heating of the web or blank workpiece.

Tests were also conducted at low laser power (60 watts) where the workpiece was translated under the laser beam at speeds up to 600 inches per minute. In these tests, the laser beam was focused to a small spot, and the spot was dithered transverse to the translation direction of the coated paperboard samples. This technique allowed the samples to be uniformly heated over a 0.5 inch wide strip.

EXAMPLE RESULTS AND COMPARISON TO THEORY

In the pulsed laser sealing tests, good seals were obtained when the laser deposition time was approximately equal to or greater than 10 milliseconds. Pressure bonding of the surface occured 60 milliseconds after deposition of the laser energy. The average laser power incident on each surface was 300–400 watts. The process speed corresponding to the laser irradiance time and spot size was 3000 inches per minute. Given these test parameters, the theoretical model can be used to approximate the good seal conditions. The thermophysical parameters used in these calculations are given in the following table. The absorption coefficient of paperboard was approximated by the value 1000 cm$^{-1}$.

From Eq. (1) it is found that the surface temperature of the paperboard 60 milliseconds after laser heating is $$T = 1.3 \, I_{PB} \tag{3}$$

The temperature of the paperboard surface region 10 must be greater than 118° C. otherwise the polyethylene coating 8 will not be above its softening point temperature; therefore we can set $\Delta T$ equal to T-To where T=118° C. and To=20° C. Substituting this value for T into Eq. (3), gives $$I_{PB} = 75 \, W/cm^2.$$

The laser irradiance ($I_P$) used in heating the polyethylene coating 8 to its softening point is found from the energy balance relationship $$I_P = \frac{\rho d C_p \Delta T}{\tau} \tag{4}$$

where d is the laser spot size.

Substitution of appropriate parameters into Eq. (4) gives $$I_P = 81 \, W/cm^2.$$

The total laser irradiance is found from Eq. (2).

$$I_a = I_{PB} + I_P = 156 \, W/cm^2.$$

Figure 6:
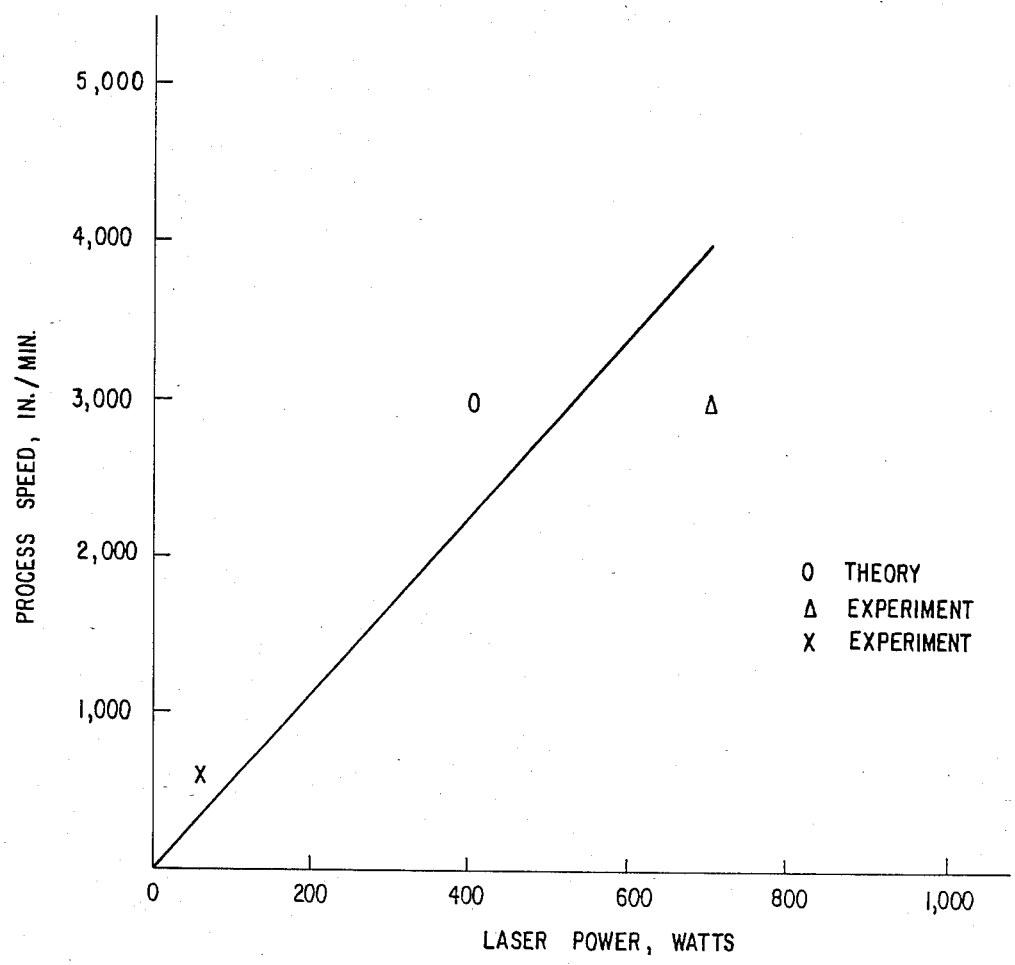
FIG. 6 illustrates a relation between laser power and linear workpiece speed.

This value must be doubled to account for the two surfaces of the workpiece 6 involved in a sealing operation. Based on a laser spot size of 0.5 inches, the total incident laser power predicted from theory is 396 watts. This compares to the experimental value of 700 watts. These values are shown in FIG. 6. The results of two sealing tests are also shown. The straight line represents an estimated average of experimental results and theoretical predictions. As seen from FIG. 6, agreement between theory and experiment is better than a factor of two. In view of the approximations involved in the theoretical calculation, this agreement is considered satisfactory.

The thermal diffusivity coefficient of paperboard blank 6 and the time increment between heating and sealing are two key parameters affecting the efficiency of the process. Conduction of heat into the interior of the paperboard is unproductive to the sealing process, consequently a small value for K is desirable.

Figure 7:
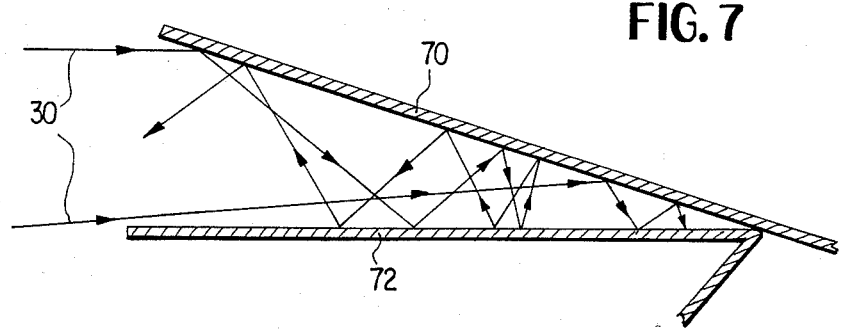
FIG. 7 is a cross-sectional view of two edge portions of a container forming blank, or other tubular members the edges adapted to be joined by overlapping to thereby join a seam.

Referring now to FIG. 7, an alternative method of sealing edge portions of a substrate member, such as blank 6, is shown. The numerals 70 and 72 denote edges of such a blank, which edges are to be overlapped and sealed to thereby form a seam in a container, such as a sidewall seam.

Laser sealing studies have established that coated paperboard laminates without metal foil barriers can be effectively sealed with an unfocused laser beam. However, because of the substantially transparent properties

TABLE I

| Material | Thermophysical Properties of Polyethylene and Paperboard | | | |
|---|---|---|---|---|
| | Thermophysical Properties | | | |
| | Density, ρ | Specific heat, $C_p$ | Thermal Conductivity, k | Thermal Diffusivity K |
| Polyethylene | 0.94 gm/cm$^3$ | 2.3 J/gm. °C. | 3.7 × 10$^{-3}$ W/cm — °C. | 1.7 × 10$^{-3}$ cm$^2$/Sec |
| Paperboard | 0.90 gm/cm$^3$ | 2.0 J/gm — °C. | 1.8 × 10$^{-4}$ W/cm — °C. | 10$^{-4}$ cm$^2$/Sec | of the polyethylene coating and the reflective properties of metal, laminates containing a foil material cannot be sealed under the same conditions. One method of remedying this problem entails the addition of an absorbent material to the coating. Another approach which eliminates the need to modify the packaging materials involves directing the laser beam into a cavity formed by the coated paperboard surfaces themselves. The laser beam 30 is first transmitted through a conventional long focal length lens (not shown at FIG. 7) and then directed to the work area defined by the wedge shaped cavity between edges 70 and 72. The partially focused laser beam 30 undergoes multiple reflections within the cavity, thereby permitting most of the laser energy to be absorbed at the polyethylene coated surfaces to be overlapped. A mandrel, such as mandrel 60, receives the substrate member on the external surface of the former, while the irradiation illustrated at FIG. 7 is carried out.

For example, the fraction of the incident laser light absorbed in n passes through the polyethylene coating is given by $$F_n = [1 - (e^{-\alpha y})^n] \tag{5}$$

where $\alpha$ is the absorption coefficient in polyethylene and y is the thickness of the coating. Based on an absorption coefficient in polyethylene of 18 cm$^{-1}$ ($\lambda$=10.6 $\mu$m) and a coating thickness of 0.0015 inch (0.0038 cm) it is seen from equation (5) that less than 10% of the laser beam energy is absorbed in a single pass through the film, whereas in 20 passes approximately 75% of the beam energy is absorbed. In addition, because of multiple interactions, the laser energy is uniformly absorbed over the surface area to be sealed, thereby mitigating the effect of laser power related in homogeneities in the beam.

Generally speaking, the present invention is directed to a method and apparatus for forming a seam on a thermoplastic coated container, which container has been formed from a single blank or a continuous web by bending the substrate material from which it is formed and overlapping opposite edges thereof to form the seam. According to the practice of this invention, the edges of the substrate member that are to be overlapped and joined to form the seam are each heated, prior to their overlapping, by energy from a laser to thereby render the thermoplastic coatings on the overlapped portions of the blank soft and tacky so that they will adhere to each other when pressed together and allowed to cool. The substrate members may be coated, or, alternatively, if made from a continuous web, the same may be heated at its edges and blanks formed thereafter. The laser energy is applied by directing an unfocused laser beam of 10.6 $\mu$m wavelength over a zone about one-half inch in width to each of the two edges, the web or blanks being fed along a conveyor past the stationary laser sources.

Although the invention has been described above by reference to preferred embodiments, it will be appreciated that other constructions may be devised, which are, nevertheless, within the scope and spirit of the invention and are defined by the claims appended hereto.

What is claimed is:

1. A method of making a tubular member from a substrate member of foldable, stiff and resilient material such as paperboard or the like, said substrate member being coated on its surfaces with a heat softenable and rehardenable thermoplastic material, the method including:
   (a) heating at least one edge of the member that is to be joined to thereby soften the coated thermoplastic material at said edge to form a bondable seam surface,
   (b) overlapping opposite edges of the member to present said heated seam surface in opposing relation,
   (c) subjecting said overlapping edges of the member to pressure to form a seam, said heating step being carried out by subjecting at least one edge of the member with energy from a laser over an area of a width substantially equal to the width of seam, prior to opposite edge surfaces being placed in surface contact with each other, said heating rendering said at least one seam surface soft and tacky.

2. The method of claim 1 wherein the thermoplastic material and the wavelength of the laser energy are so related that the thermoplastic material is substantially transparent to the laser energy, the heating of the thermoplastic material taking place by virtue of absorption of at least a part of the laser energy by the substrate and subsequent conduction of heat from the surface of the substrate to the thermoplastic coating.

3. The method of claim 2 wherein the wavelength of the laser beam is about 10.6 $\mu$m.

4. The method of claim 3 wherein the thermoplastic coating material is polyethylene.

5. The method of claim 4 wherein the thickness of the polyethylene coating is about 0.003 inches.

6. The method of claim 1 wherein the width of the seam is about one-half inch.

7. The method of claim 2 wherein the substrate member is moved relative to the source of the laser energy.

8. The method of claim 2 wherein the laser energy is in the form of an unfocused beam.

9. The method of claim 2 wherein each of the two thermoplastic material surfaces to be overlapped is subjected to laser energy.

10. A method of preparing opposite edges of a substrate member for overlapping and subsequent sealing, to thereby form a container or tubular member seam, the substrate member having heat softenable and rehardenable thermoplastic surfaces, the steps of positioning the surfaces which are to be overlapped to form a wedge shaped cavity, directing an unfocused laser beam into the cavity at such an angle that multiple reflections between the facing, thermoplastic surfaces occur to thereby heat the thermoplastic surfaces the thermoplastic material and the wavelength of the laser energy being so related that the thermoplastic material is substantially transparent to the laser energy, the heating of the thermoplastic material taking place by virtue of absorption of at least a part of the laser energy by the substrate and subsequent conduction of heat from the surface of the substrate to the thermoplastic coating, thereafter, while the thermoplastic surfaces are still tacky, pushing the surfaces together, and thereafter allowing the thermoplastic surfaces to cool and thereby form a seam.

11. The method of claim 10 wherein the thermoplastic surfaces are edges of a one piece substrate member formed of a stiff, foldable and resilient sheet material, such as paperboard, and coated on its surfaces with the heat softenable and rehardenable thermoplastic material.

12. An apparatus for making a container from a blank of stiff, resilient and foldable material such as paperboard coated on its two surfaces with a thermoplastic material, the apparatus including, means for conveying a substrate member, means for generating a beam of laser energy for incidence on at least one of the two opposite edge surfaces of the substrate member, whereby the laser beam heats the thermoplastic coating on which it is incident by heating the substrate and causes the coating to become tacky, whereby the substrate may be then wrapped around a mandrel and the at least one tack edge surface pressed onto an opposite substrate member edge surface to thereby form a seamed tube for forming a container.

13. The apparatus of claim 12 wherein the wavelength of the laser beam is about 10.6 μm.

14. The apparatus of claim 12 including means for splitting the beam of laser energy to thereby yield two laser beams, each beam falling upon and incident on an alternative edge surface of the substrate member whereby two opposite edge surfaces become tacky, the two tacky surfaces pressed together to form a seamed tube.

* * * * *